US011922367B2

(12) United States Patent
Sato et al.

(10) Patent No.: US 11,922,367 B2
(45) Date of Patent: Mar. 5, 2024

(54) STOCKER SYSTEM

(71) Applicant: FUJI CORPORATION, Chiryu (JP)

(72) Inventors: Takeshi Sato, Nagoya (JP); Wataru Hosoi, Chiryu (JP); Akihiro Higashida, Chiryu (JP); Joji Isozumi, Cupertino, CA (US); Kenta Hagihara, San Jose, CA (US)

(73) Assignee: FUJI CORPORATION, Chiryu (JP)

( * ) Notice: Subject to any disclaimer, the term of this patent is extended or adjusted under 35 U.S.C. 154(b) by 115 days.

(21) Appl. No.: 17/275,100

(22) PCT Filed: Dec. 26, 2018

(86) PCT No.: PCT/US2018/067491
§ 371 (c)(1),
(2) Date: Mar. 10, 2021

(87) PCT Pub. No.: WO2020/139318
PCT Pub. Date: Jul. 2, 2020

(65) Prior Publication Data
US 2022/0051185 A1     Feb. 17, 2022

(51) Int. Cl.
*G06Q 10/0836* (2023.01)
*B65G 1/137* (2006.01)
(Continued)

(52) U.S. Cl.
CPC ....... *G06Q 10/0836* (2013.01); *B65G 1/1371* (2013.01); *G06Q 10/087* (2013.01); *H04L 63/08* (2013.01)

(58) Field of Classification Search
None
See application file for complete search history.

(56) References Cited

U.S. PATENT DOCUMENTS 7,693,745 B1 * 4/2010 Pomerantz .............. G07F 17/13
705/26.5
9,120,622 B1 * 9/2015 Elazary .................. B25J 9/1697
(Continued)

FOREIGN PATENT DOCUMENTS

JP    2002-193409 A    7/2002
JP    2004-250184 A    9/2004
(Continued)

OTHER PUBLICATIONS

International Search Report dated Apr. 2, 2019 in PCT/US2018/067491 filed on Dec. 26, 2018, 2 pages.
(Continued)

*Primary Examiner* — Fateh M Obaid
(74) *Attorney, Agent, or Firm* — Oblon, McClelland, Maier & Neustadt, L.L.P.

(57) ABSTRACT

A stocker system for transporting a good via a transport vehicle to a stocker with multiple storage compartments, the stocker system including: a stocker information memory section configured to memorize stocker information including arrangement position information of the storage compartments in the stocker, and information of presence or absence of the good in the storage compartments; a stocker information updating section configured to update the stocker information in accordance with the goods being taken in and out of the storage compartments; and a stopping position setting section configured to acquire the arrangement position information of an empty storage compartment from the stocker information and to set a stopping position of the transport vehicle for the good to be put into the empty storage compartment based on the acquired arrangement position information of the empty storage compartment.

3 Claims, 8 Drawing Sheets

(51) Int. Cl.
*G06Q 10/087* (2023.01)
*H04L 9/40* (2022.01)

(56) References Cited

U.S. PATENT DOCUMENTS

| | | | | |
|---|---|---|---|---|
| 9,520,012 | B2* | 12/2016 | Stiernagle | G07F 11/165 |
| 11,175,656 | B2* | 11/2021 | Iagnemma | G05D 1/0088 |
| 2006/0155592 | A1* | 7/2006 | Burkert | G06Q 10/06 |
| | | | | 705/28 |
| 2014/0100769 | A1* | 4/2014 | Wurman | B65G 1/10 |
| | | | | 705/22 |
| 2022/0063085 | A1* | 3/2022 | Chintamani | B25J 5/007 |

FOREIGN PATENT DOCUMENTS

| | | |
|---|---|---|
| JP | 2005-301698 A | 10/2005 |
| WO | WO 2005/110896 A1 | 11/2005 |

OTHER PUBLICATIONS

Written Opinion dated Apr. 2, 2019 in PCT/US2018/067491 filed on Dec. 26, 2018, 8 pages.

\* cited by examiner

STOCKER SYSTEM

TECHNICAL FIELD

The present disclosure relates to a stocker system.

BACKGROUND ART

Conventionally, there are known systems for transporting goods to a specified location via a transport vehicle such as a truck. For example, as disclosed in patent literature 1, each of multiple types of goods to be transported are transported in a truck to a predetermined location, an operator removes the goods from the truck, and transfers the goods to a location corresponding to the type of good. Also, based on information of the loading position of the goods in the truck and information of a delivery position to which the goods are to be delivered, the stopping position of the truck is set such that the transfer distance for the operator from the truck to the delivery position is shortened.

CITATION LIST

Patent Literature

Patent literature 1: JP-A-2005-301698

BRIEF SUMMARY OF INVENTION

Problem to be Solved

However, there are cases in which goods that have been purchased by a user are transported to a stocker with multiple storage compartments. Such a stocker is used by an unspecified large number of users, meaning that goods are taken in and out of the storage compartments frequently, leading to constant changes to the positions of empty storage compartments; this means that it is difficult to predict in advance to which storage compartment a good should be delivered, meaning that it is difficult to set the stopping position of the delivery truck as in patent literature 1. Also, it is necessary to perform work of registering information about which goods are stored in which storage compartments such that a user can use a reading device to read information required to pick up their goods. Due to this, there are cases in which it takes a long time to get goods from the delivery truck to the storage compartment, meaning there is room for improving such a system.

An object of the present disclosure is to efficiently perform delivery of a good from a transport vehicle to a storage compartment when transporting goods in a transport vehicle to a stocker with multiple storage compartments.

Means for Solving the Problem

The present disclosure employs the following means to achieve the above object.

A first stocker system of the present disclosure is a stocker system for transporting goods via a transport vehicle to a stocker with multiple storage compartments, the stocker system including: a stocker information memory section configured to memorize stocker information including arrangement position information of the storage compartments in the stocker, and information of presence or absence of the good in the storage compartments; a stocker information updating section configured to update the stocker information in accordance with goods being taken in and out of the storage compartments; and a stopping position setting section configured to acquire the arrangement position information of an empty storage compartment from the stocker information and to set a stopping position of the transport vehicle for the good to be put into the empty storage compartment based on the acquired arrangement position information of the empty storage compartment.

The first stocker system of the present disclosure sets the stopping position of the transport vehicle for a good to be put into an empty storage compartment based on arrangement position information of empty storage compartments acquired from the stocker information. Accordingly, even if the position of empty compartments in the stocker is constantly changing due to goods being taken in and out, it is possible to appropriately set the stopping position of the transport vehicle. Thus, the transfer distance of the good when moving the good to a storage compartment from the transport vehicle is shortened, and delivery of goods is performed efficiently.

DESCRIPTION OF EMBODIMENTS

Figure 1:
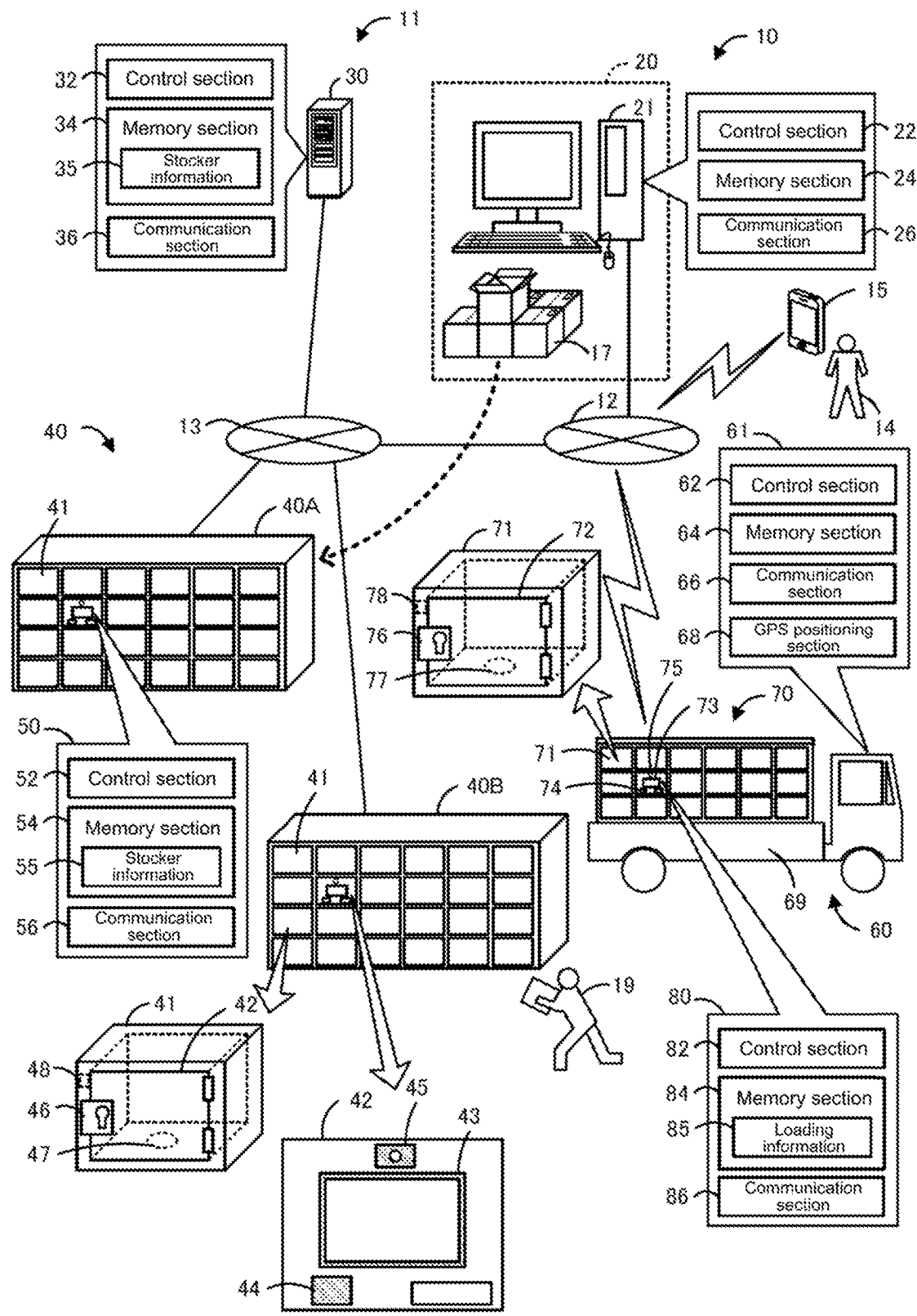
FIG. 1 illustrates an example of sales management system 10 and stocker system 11.
Figure 2:
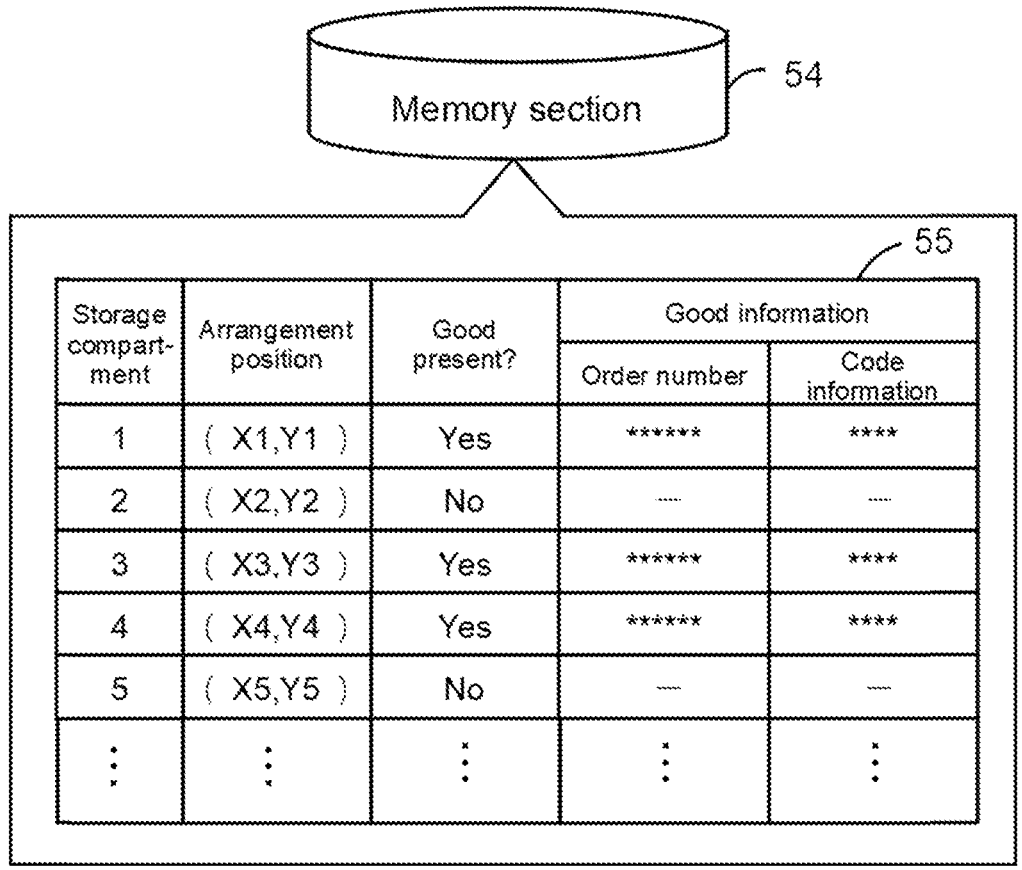
FIG. 2 illustrates an example of stocker information 55 of stocker 40.
Figure 3:
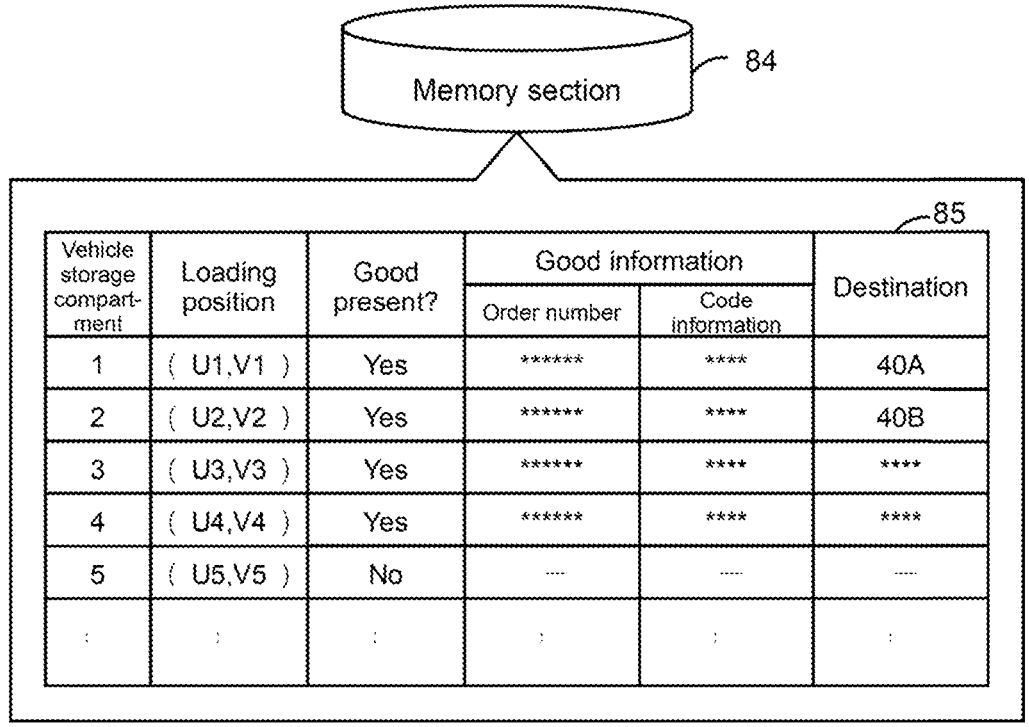
FIG. 3 illustrates an example of loading information 85 of transport vehicle 60.

Embodiments of the present disclosure are described below with reference to the figures. FIG. 1 illustrates an example of sales management system 10 and stocker system 11, FIG. 2 illustrates an example of stocker information 55 of stocker 40, and FIG. 3 illustrates an example of loading information 85 of transport vehicle 60.

Sales management system 10 is used by a business person for managing shops 20 or the like, and is provided with sales management device 21. Sales management device 21 performs exchange of information with, for example, mobile terminals 15 of purchasers 14 via network 12, such as the internet, and presents product information related to products 17 to purchasers 14. Sales management device 21 is provided with control section 22, memory section 24, and communication section 26. Control section 22 is configured from items such as a CPU, ROM, and RAM and performs overall device control. Memory section 24 memorizes various application programs and various data files. Communication section 26 performs communication with external devices. A business person sends items such as usage requests of stocker 40 from sales management device 21 to stocker management device 30. Also, the business person sends products 17 to stocker 40 from shop 20 or the like by delivery person 19 driving transport vehicle 60 of stocker system 11.

Stocker system 11 is configured from stocker management device 30, multiple stockers 40 (stocker 40A, 40B, and so on), and transport vehicle 60, these items being connected via network 13 such as the internet. Stocker 40 is set at a location such as an office, convenience store, factory, station, apartment building, or the like, and is used to deliver products 17 to purchasers 14. Stocker 40 is provided with multiple storage compartments 41 that are lockable. Each storage compartment 41 is configured to be able to accommodate a good such as product 17, and is provided with front door 42, lock mechanism 46 for locking and releasing the locking of door 42, good sensor 47 for detecting the presence or absence of a product inside storage compartment 41, and open-closed sensor 48 for detecting the opening and closing of door 42. In stocker 40, stocker control device 50 is housed in one of the storage compartments 41, and display operation section 43, reading device 44, and imaging device 45 are arranged in door 42 of that storage compartment 41. Display operation section 43 is a touch panel for displaying various information to product delivery person 19 or purchaser 14, and for receiving various input operations from delivery person 19 and purchaser 14. Reading device 44 is a code reader for reading code information such as a password used by delivery person 19 or purchaser 14 to unlock storage compartment 41. Imaging device 45 is a camera capable of imaging a specified range in front of stocker 40, and is used for imaging delivery person 19 or purchaser 14 who is putting in or taking out product 17 to or from storage compartment 41, or transport vehicle 60 that is in front of stocker 40, and sending the captured image to stocker control device 50.

Similar to sales management device 21, stocker control device 50 is provided with control section 52, memory section 54, and communication section 56. Memory section 54 memorizes stocker information 55 shown in FIG. 2 and the like. Stocker information 55 includes, for each storage compartment 41 of stocker 40, information on the detection state of the presence or absence of a product by product sensor 47, and arrangement position information regarding an arrangement position. Also, in stocker information 55, for a product 17 housed in a storage compartment 41, good information (specified information) such as code information for releasing the lock of the storage compartment 41 and an order number set by sales management device 21 is also linked and registered. The arrangement position information of storage compartment 41 is, for example, information represented by XY coordinates with the X coordinates being in a sideways direction and the Y coordinates being in a height direction from reference position O that is a specified position such as the bottom left corner of the front surface of stocker 40, but may also be information with only X coordinates in the sideways direction. Also, reference position O of stocker 40 may be position information registered in memory section 54 that is measured using a GPS positioning device or the like when stocker 40 is set up.

Stocker management device 30 performs exchange of information with stocker 40, transport vehicle 60, and sales management device 21 via networks 12 and 13. Similar to sales management device 21, stocker management device 30 is provided with control section 32, memory section 34, and communication section 36. Memory section 34 memorizes items such as stocker information 35 including the same information as stocker information 55 of each stocker 40. Stocker management device 30, by communication with each stocker 40, updates stocker information 35 in accordance with updates to stocker information 55 of each stocker 40.

Transport vehicle 60 is provided with cargo bed 69 and is used for transporting products 17 to stocker 40. Transport vehicle 60 is provided with traveling control device 61, vehicle stocker 70, and stocker control device 80. Traveling control device 61 and stocker control device 80 may be a single control device. Traveling control device 61 is provided with control section 62, memory section 64, and communication section 66. Control section 62 is configured from items such as a CPU, ROM, and RAM and performs control related to traveling and stopping of a vehicle. Memory section 64 memorizes various application programs and various data files such as maps. Communication section 66 performs communication with items such as stocker management device 30, stocker 40, and stocker control device 80. GPS positioning section 68 receives electromagnetic waves from a GPS satellite, calculates latitude and longitude, and measures the current position of transport vehicle 60. Transport vehicle 60 is moved to stocker 40 by being driven by delivery person 19, but when stopping in front of stocker 40, may be set to be stopped automatically by automatic stopping control of control section 62.

Vehicle stocker 70 has a similar configuration to stocker 40, is loaded on cargo bed 69 of transport vehicle 60, and is provided with multiple vehicle storage compartments 71 that can be locked. Similar to storage compartment 41, each vehicle storage compartment 71 is provided with door 72, lock mechanism 76, good sensor 77, and open-closed sensor 78. Similar to stocker control device 50, display operation section 73, reading device 74, and imaging device 75 are arranged in a door of stocker control device 80. Display operation section 73 is a touch panel for displaying various information to product delivery person 19, and for receiving various input operations from delivery person 19. Reading device 74 is a code reader for reading code information such as a password used to authenticate delivery person 19. Imaging device 75 is a camera capable of imaging a specified range in front of vehicle stocker 70.

Similar to stocker control device 50, stocker control device 80 includes control section 82, memory section 84, and communication section 86, and performs communication with stocker management device 30, stocker 40, traveling control device 61, and the like. Memory section 84 memorizes items such as loading information 85 shown in FIG. 3. Loading information 85, similar to stocker information 55, for each vehicle storage compartment 71, registers position information regarding the loading position (arrangement position) of the good, information of the presence or absence of the good, and good information (specified information) such as an order number or code information for releasing the lock of storage compartment 41 of stocker 40. Loading information 85 also registers information of stocker 40 that is the delivery target for each good that is different to stocker information 55. Position information of vehicle storage compartment 71 is, for example, information represented by UV coordinates with the U coordinates being in a sideways direction and the V coordinates being in a height direction from a specified position of vehicle stocker 70 as a reference, but may also be information with only U coordinates in the sideways direction. Distance L (refer to FIG. 7) from the reference position of the UV coordinate system to a reference position such as a leading end position of transport vehicle 60 is registered on memory section 84 or the like.

Operations of sales management system 10 and stocker system 11 configured in the above manner are described below. First, purchaser 14 operates mobile terminal 15 or the like to select a desired product 17 from product information of sales management device 21, enters information of a stocker 40 from which they wish to pick up the product, and orders the product 17. Sales management device 21, upon receiving the order for product 17, sets good information such as an order number and code information required to pick up the product 17, memorizes this as sales information including information such as information of purchaser 14 and information of the stocker 40 from they wish to pick up the product, and sends the information to stocker management device 30. Stocker management device 30 receives the stocker 40 from which the purchaser wants to pick up the product, and arranges loading of product 17 on transport vehicle 60 via sales management device 21. Delivery person 19 loads products 17 into vehicle stocker 70 of transport vehicle 60. When loading products 17, delivery person 19 registers good information such as the order number and code information of each product 17, and various information such as the stocker 40 to which to deliver to as loading information 85 via reading using reading device 74 or operation of display operation section 73 of stocker control device 80. When loading of products 17 is complete, stocker management device 30 or sales management device 21 instructs delivery person 19 to transport the products 17. Also, stocker management device 30 sends authentication information of transport vehicle 60 to each stocker 40. Described below is processing when delivery person 19 transports products 17 to a destination stocker 40 using vehicle 60, and loads the products 17 into stocker 40. Descriptions are given below with product 17 referred to as a good.

Figure 4:
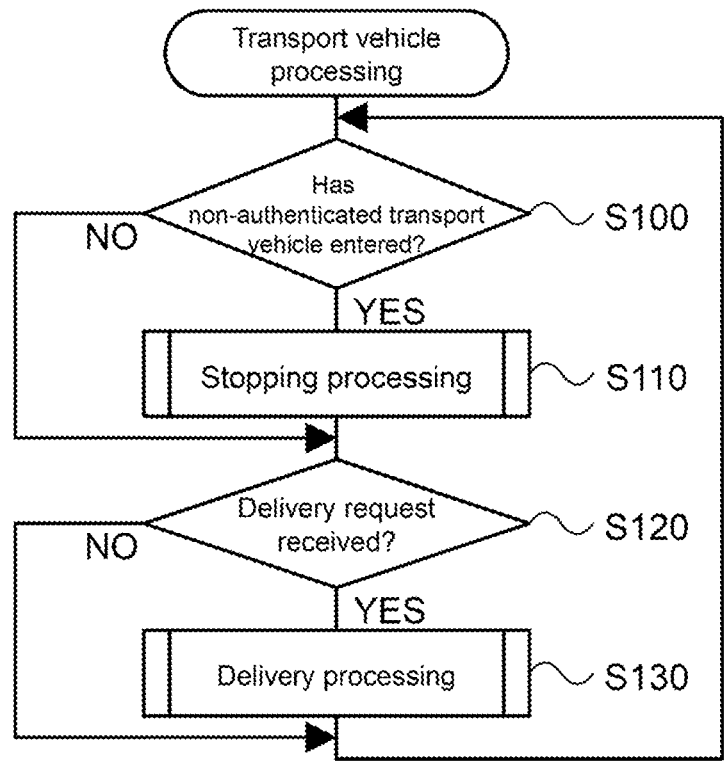
FIG. 4 is a flowchart showing an example of transport vehicle processing.

FIG. 4 is a flowchart showing an example of transport vehicle processing. The processing is memorized on memory section 54 and is performed by control section 52 at a predetermined interval after stocker control device 50 is turned on. Control section 52, first, determines whether there is a non-authenticated transport vehicle 60 inside a management range (S100). The management range may be, for example, a range of specified distances centered around stocker 40. In S100, control section 52 determines whether a transport vehicle 60 has arrived based on the strength of a specified signal output from communication section 66 of traveling control device 61 of transport vehicle 60, or determines whether a transport vehicle 60 has arrived based on the current position of the transport vehicle 60 acquired via communication based on positioning by GPS positioning section 68. Once authentication processing has been performed for a transport vehicle 60, control section 52 considers that transport vehicle to be authenticated until it leaves the management range. Control section 52, upon determining that a non-authenticated transport vehicle 60 has arrived, executes stopping processing (S110) then proceeds to S120, or, upon determining that no non-authenticated transport vehicle 60 has arrived, skips S110 and proceeds to S120. Next, control section 52 determines whether a delivery request sent from a transport vehicle 60 inside the management range has been received (S120), and upon determining that a delivery request has been received, executes delivery processing (S130), or, upon determining that no delivery request has been received, skips S130 and returns to S100.

Stopping processing of S110 is described next based on the flowchart shown in FIG. 5. In this processing, control section 52, first, executes authentication processing of transport vehicle 60 (S200), and determines whether authentication is successful (S210). Control section 52 compares authentication information of transport vehicle 60 sent from stocker management device 30 and authentication information included in the signal sent from transport vehicle 60 and, if both match, determines that authentication is successful. Control section 52, upon determining that authentication of transport vehicle 60 is not successful, ends stopping processing, or, upon determining that authentication of transport vehicle 60 is successful, sends authentication complete information to transport vehicle 60 (S220) and waits to receive loading position information from transport vehicle 60 (S230). Included in the authentication complete information is identification information of stocker 40 (whether it is stocker 40A or stocker 40B). Loading position information is sent in transport vehicle stopping processing executed by traveling control device 61 of the transport vehicle that arrived in the management range of stocker 40. Here, we leave descriptions of stopping processing and turn to descriptions of transport vehicle stopping processing.

Figure 6:
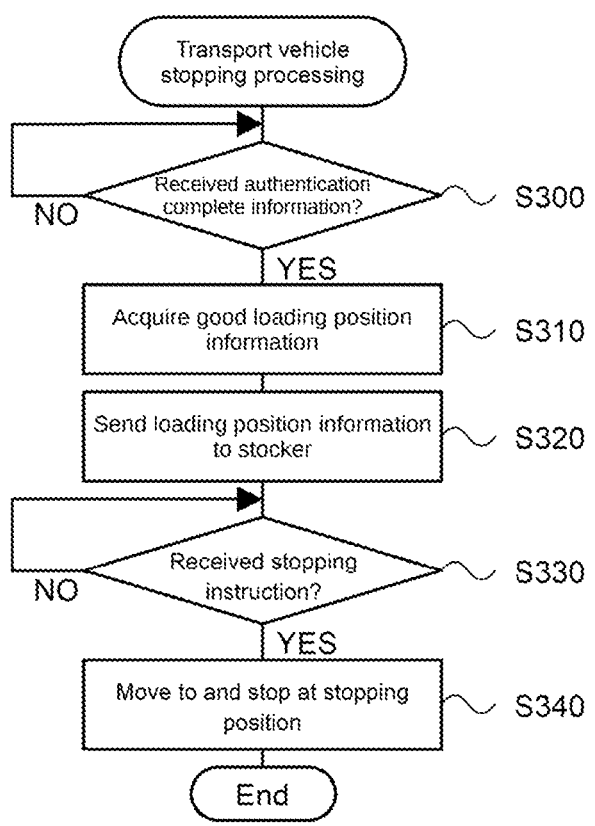
FIG. 6 is a flowchart showing an example of transport vehicle stopping processing.

FIG. 6 is a flowchart showing an example of transport vehicle stopping processing. Control section 62 of traveling control device 61, first, waits to receive authentication complete information sent from stocker 40 (S300). Control section 62, upon receiving authentication complete information, by communicating with stocker control device 80 of vehicle stocker 70, acquires loading position information of goods loaded on vehicle stocker 70 from loading information 85 (S310), and sends the loading position information to stocker 40 (S320). Control section 62 acquires and sends loading position information for goods that match the delivery destination in the identification information of stocker 40 included in the authentication complete information. In the example of FIG. 3, if the destination is stocker 40A, loading position information of number 1 of vehicle storage compartment 71 is sent. Also, control section 62 sends distance L from the reference position of the UV coordinate system to the leading end of transport vehicle 60 included in the loading position information. Next, control section 62 waits to receive a stopping instruction sent from stocker 40 (S330). Control section 62, upon determining that the stopping instruction has been received, moves transport vehicle 60 to the stopping position included in the stopping instruction and stops transport vehicle 60 at the stopping position (S340), then ends transport vehicle stopping processing. Note that, control section 62, from the arrival into the management range of stocker 40 until receiving the stopping instruction in S330, may cause transport vehicle 60 to travel at low speed, or may stop transport vehicle 60 at a provisional stopping position. In S340, stopping is performed at the stopping position via automatic stopping control, but an instruction may be output to delivery person 19 who is also a driver, and they may stop transport vehicle 60 at the stopping position. For example, control section 62 may output instructions to delivery person 19 by using audio or visual display or the like to issue a notice regarding the distance and movement direction until the stopping position of transport vehicle 60 is reached, and to issue a notice when the current position matches the stopping position.

Figure 5:
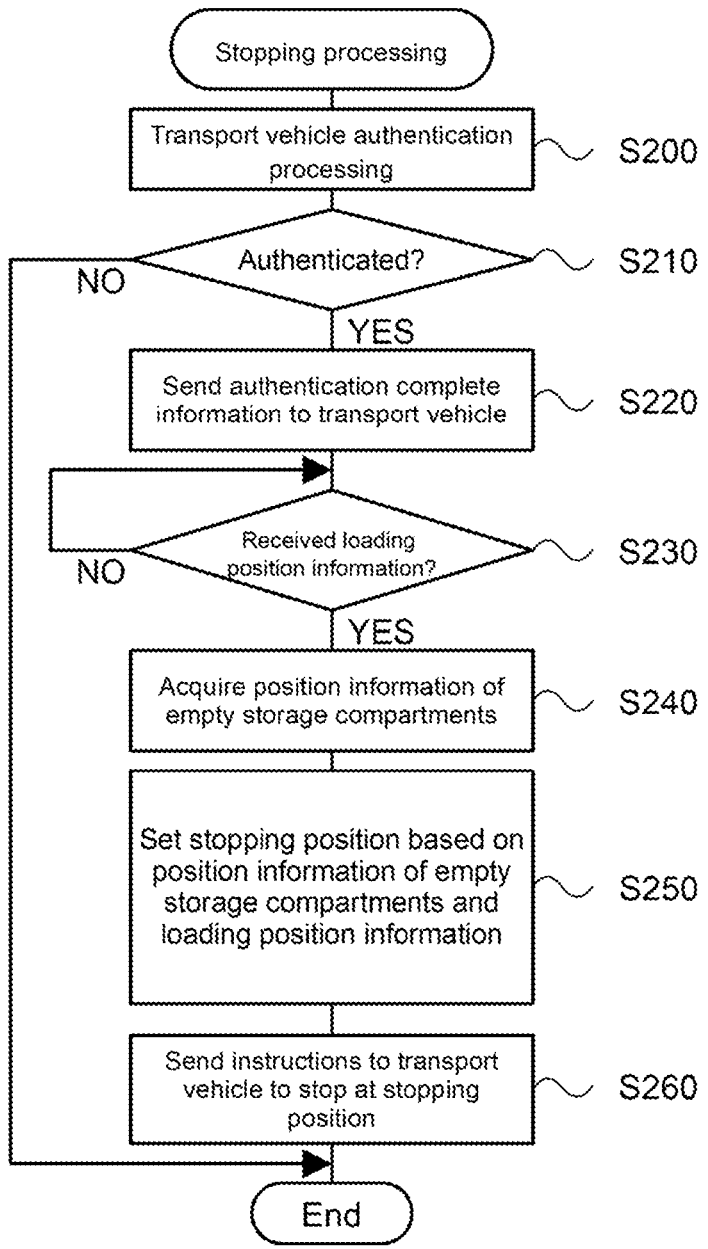
FIG. 5 is a flowchart showing an example of stopping processing.

In the stopping processing of FIG. 5, control section 52, upon determining in S230 that the loading position information has been received from transport vehicle 60, acquires the position information of empty storage compartments among the storage compartments 41 of stocker 40 in which goods are not loaded from stocker information 55 (S240). In the example of FIG. 2, the latest arrangement position information of the empty storage compartments, that is, arrangement position information of number 2 and number 5 storage compartments 41, is acquired. Then, control section 52 sets the stopping position based on the position information of the empty storage compartments and the received loading position information (S250). Control section 52 sets the stopping position such that the arrangement position of the empty storage compartments of stocker 40 and the loading positions of transport vehicle 60 are close.

Figure 7A:
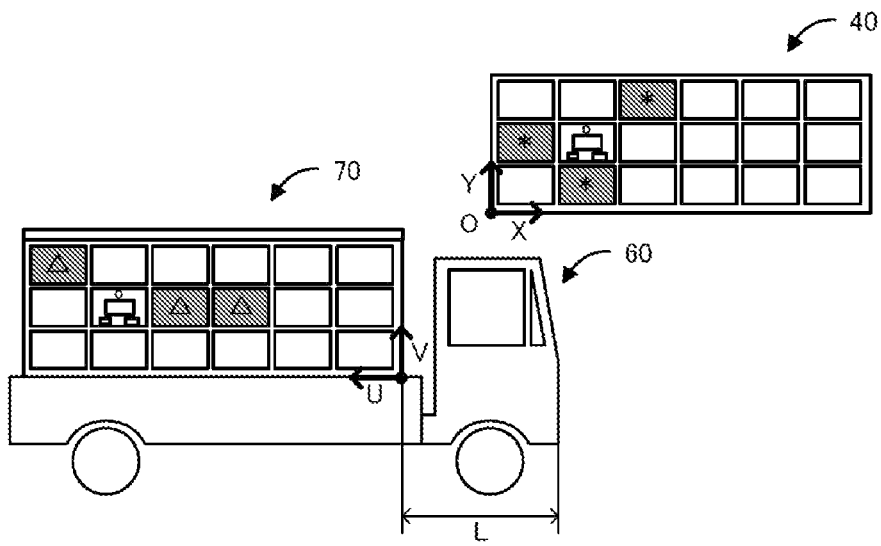
FIG. 7 illustrates an example of stopping position P of transport vehicle 60.
Figure 7B:
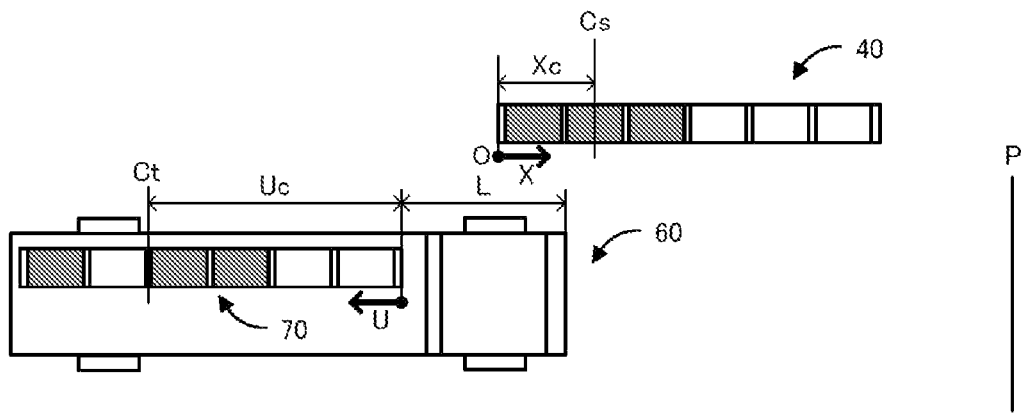
Figure 7C:
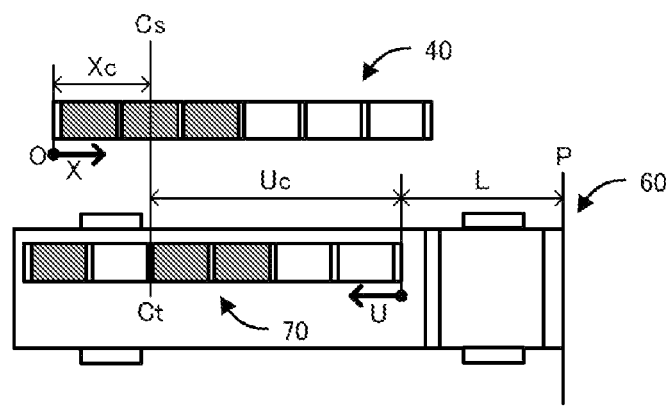

FIG. 7 illustrates an example of stopping position P of transport vehicle 60. In FIG. 7A, the positional relationship between stocker 40 and transport vehicle 60 is shown from the front. Also, the loading position on vehicle stocker 70 of goods to be delivered to stocker 40, that is, vehicle storage compartments 71 in which the goods are loaded, are shown by triangle mark Δ, and empty storage compartments in stocker 40 are shown by asterisk mark *. In FIG. 7A, there are three each of triangle mark Δ and asterisk mark*. For ease of understanding, in the figures storage compartments 41 and vehicle storage compartments 71 are facing the same direction, but transport vehicle 60 may be moved such that doors 42 of storage compartments 41 and doors 72 of vehicle storage compartments 71 are facing each other. In FIGS. 7B and 7C, the positional relationship of stocker 40 and transport vehicle 60 is shown from above. In FIGS. 7B and 7C, locations of storage compartments with triangle mark Δ and asterisk mark * above are shown shaded (for the row of the storage compartment). Control section 52 calculates distance Xc that is the X coordinate of central position Cs of the three rows including empty storage compartments from the X coordinates of the three empty storage compartments of stocker 40. Further, control section 52 calculates distance Uc that is the U coordinate of the central position Ut of the three rows including vehicle storage compartments 71 in which goods are loaded from the U coordinates of those three vehicle storage compartments 71 of vehicle stocker 70. Then, control section 52 calculates a position of transport vehicle 60 such that central position Cs matches central position Ct, and sets that position as stopping position P of transport vehicle 60. Stopping position P is a position separated from reference position O of stocker 40 in the sideways direction by the sum of distance Xc, distance Uc, and distance L that is the distance from the reference position in the UV coordinate system to the leading end of transport vehicle 60. Because reference position O of stocker 40 is positioned using GPS positioning or the like, by calculating the sum of distance Xc, distance Uc, and distance L, it is possible to set stopping position P positioned by GPS positioning section 68. Note that, setting stopping position P is not limited to a method by calculating central positions Cs and Ct, a center of gravity in the X direction for the mass of the rows including empty storage compartments shown by asterisk mark * and a center of gravity in the U direction for the mass of the rows including vehicle storage compartments 71 shown by triangle mark Δ may be calculated, and stopping position P may be set such that the two center of gravities match. Here, calculations may be performed with the mass set according to the quantities of corresponding empty storage compartments and vehicle storage compartments 71.

Control section 52, upon setting stopping position P in this manner, sends a stopping instruction to transport vehicle 60 to stop at the set stopping position (S260), and ends stopping processing. Transport vehicle 60 that has received this stopping instruction stops at the stopping position P (refer to FIG. 7C). Note that, control section 52 may send the stopping instruction after confirming that there are no users in the range of stocker 40 based on an image captured by imaging device 45. Note that, stocker 40 may be provided with a light-emitting section capable of notifying the location of stopping position P using light, and control section 52 may cause the light-emitting section to emit light as well as sending the stopping instruction. Also, control section 52 may use imaging device 45 to image transport vehicle 60 that is moving slowly in front of stocker 40, process the image, and when transport vehicle 60 has arrived at stopping position P, send the instruction to transport vehicle 60 to stop at that position.

Delivery processing of S130 is described next based on the flowchart shown in FIG. 8. Because delivery processing is performed when a delivery request sent from transport vehicle 60 is received, descriptions are given together with descriptions of processing of transport vehicle 60 sending the delivery request. FIG. 9 is a flowchart showing an example of transport vehicle delivery processing. This processing is performed by stocker control device 80 that receives a start delivery instruction from delivery person 19 with transport vehicle 60 stopped at stopping position P. In transport vehicle delivery processing, control section 82 of stocker control device 80, first, determines whether there is a delivery target good to be delivered to stocker 40 (S500), and if determining that there is no delivery target good, informs delivery person 19 of that fact and ends processing. On the other hand, if determining that there is a delivery target good, control section 82 selects the target vehicle storage compartment 71 from which to remove the good (S510). Continuing, control section 82 sends a delivery request to the stocker (S520), and waits to receive delivery permission information from stocker 40 (S530). With stocker 40 that has received the delivery request of S520, delivery processing is performed based on FIG. 8.

With delivery processing, control section 52 of stocker 40 selects an empty storage compartment as a delivery destination, sends delivery permission information to transport vehicle 60 (S400), and opens door 42 by performing releasing control of lock mechanism 46 of the delivery destination empty storage compartment (S410). The delivery destination empty storage compartment of S410 may be decided appropriately from the multiple empty storage compartments. Note that, stocker control device 80 may send the position (loading position) of the vehicle storage compartment 71 from which to remove the good included with the delivery request. In this case, control section 52 may select the empty storage compartment closest to the loading position included in the delivery request. Also, control section 52 may display the position information of the empty storage compartment for which door 42 was opened on display operation section 43. Then, control section 52 waits for door 42 of the empty storage compartment for which door 42 was opened to be closed (S420).

Control section 82 of stocker control device 80, when the delivery permission information has been sent from stocker 40, determines in S530 of the transport vehicle delivery processing that the delivery permission information has been received, performs releasing control of lock mechanism 76 of vehicle storage compartment 71 selected in S510 to open door 72 (S540), then waits for that door 72 to be closed (S550). Delivery person 19 removes a good from vehicle storage compartment 71 for which door 72 is open, closes the door 72 of the vehicle storage compartment 71, transfers the removed good to stocker 40, loads it into an empty storage compartment and closes door 42. Because the door 42 of the empty storage compartment was already open, there is no need for delivery person 19 to perform unlocking work in accordance with authentication. Also, because transport vehicle 60 is stopped at stopping position P such that the position of the empty storage compartment and the loading position of the good are close, the distance delivery person 19 has to move to transfer the good is short.

Further, upon determining that door 72 has been closed in S550, control section 82 uses sensor 77 to determine whether there is a good inside vehicle storage compartment 71 (S560). Normally, because delivery person 19 removes the good and then closes door 72, if control section 82 detects a good, then it determines that delivery person 19 has failed to correctly remove the good, reports an error (S570), and opens the door 72 of the same vehicle storage compartment 71 as in S540. That is, the door 72 of the selected vehicle storage compartment is opened again, so as to wait for the delivery person 19 to remove the good and close the door 72. On the other hand, control section 82, upon determining in S560 that no good is detected, sends good information corresponding to the current vehicle storage compartment 71 from loading information 85 to stocker 40 (S580), updates loading information 85 by deleting the good information of the current vehicle storage compartment 71 and the delivery destination and setting that vehicle storage compartment 71 as empty (S590), and ends transport vehicle delivery processing.

Figure 8:
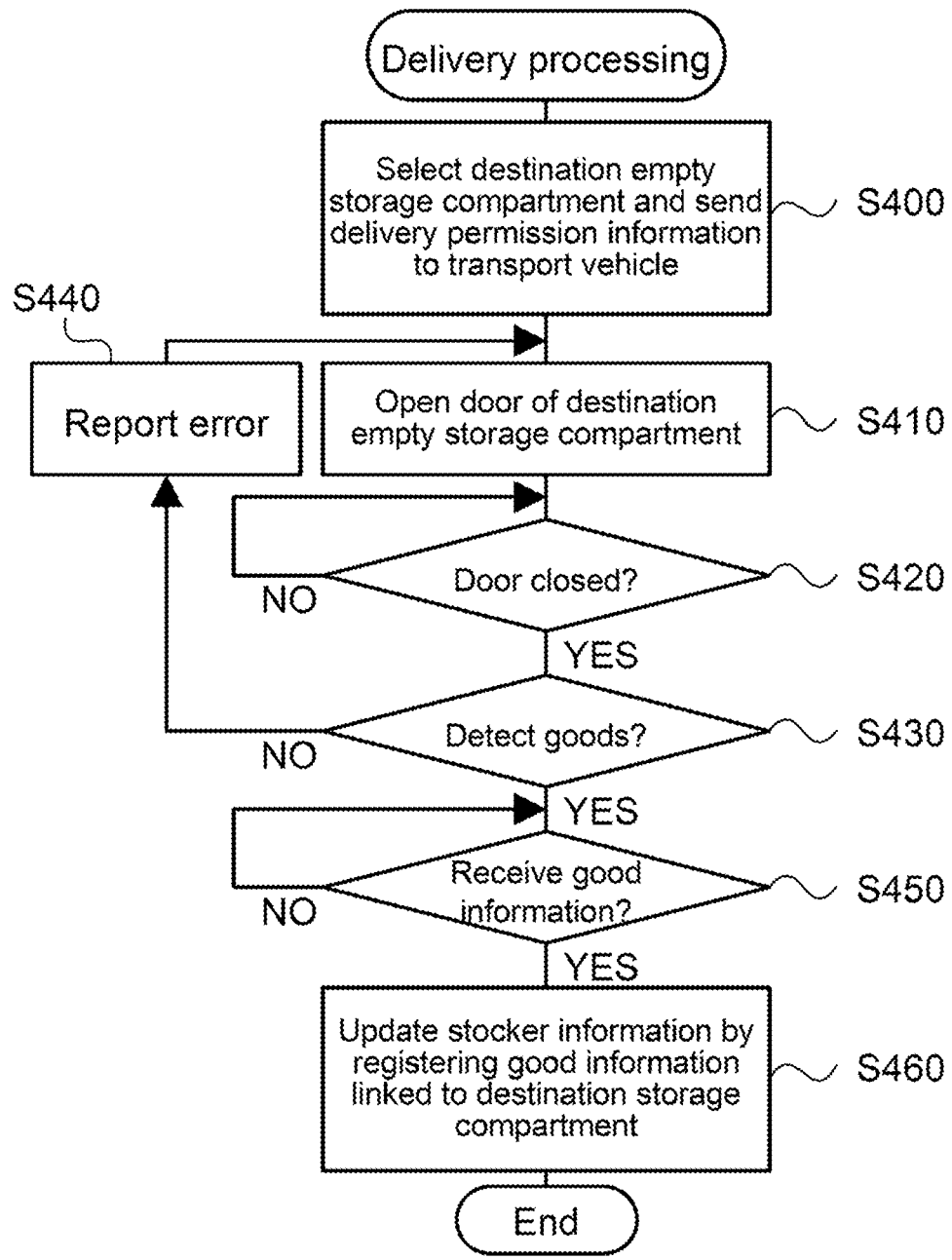
FIG. 8 is a flowchart showing an example of delivery processing.
Figure 9:
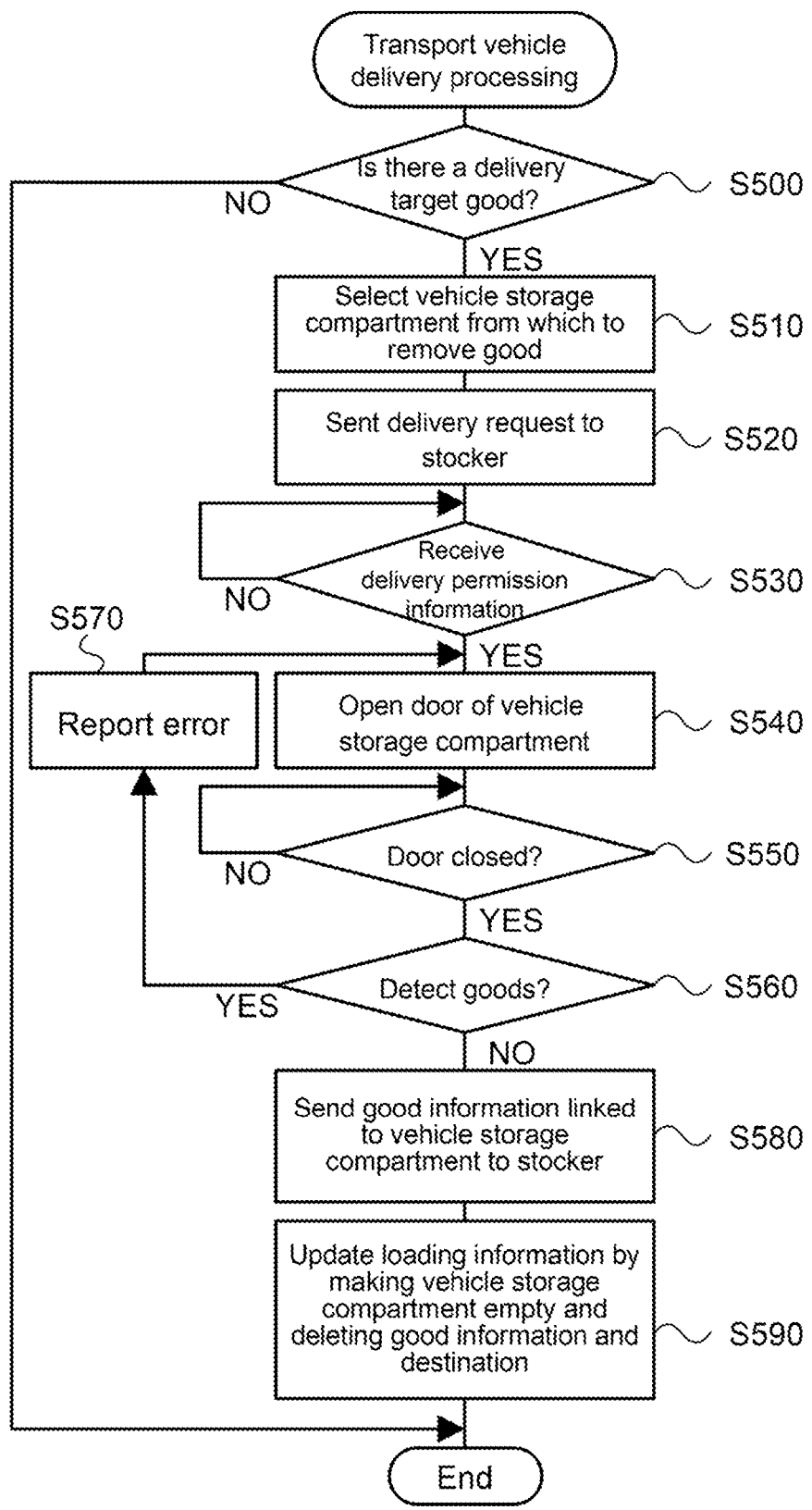
FIG. 9 is a flowchart showing an example of transport vehicle delivery processing.

On the other hand, control section 52 that performs delivery processing of FIG. 8, upon delivery person 19 loading the good into the empty storage compartment and closing door 42, determines that the door 42 was closed in S420, and determines whether the good inside the storage compartment was detected by good sensor 47 (S430). Normally, because delivery person 19 loads the good and then closes door 42, if control section 52 does not detect a good, then it determines that delivery person 19 has failed to correctly load the good, reports an error (S440), and opens the door 42 of the same empty storage compartment as in S410. That is, the door 42 of the selected empty storage compartment is opened again, so as to wait for the delivery person 19 to load the good and close the door 42. Further, control section 52, upon determining that a good was detected in S430, waits to receive good information sent from transport vehicle 60 (S450). Note that, control section 52, upon determining that a good was detected in S430 may send a request for good information to transport vehicle 60 and control section 82 that receives that request may send the good information. Control section 52, upon determining that the good information was received in S450, updates stocker information 55 by registering the good information linked to the destination storage compartment (the empty storage compartment selected in S400) into which the current good was loaded (S460) and ends delivery processing. In this manner, one by one the empty storage compartments and vehicle storage compartments 71 are opened, and if there is no good inside the vehicle storage compartment 71 for which door 72 was closed, and there is a good inside the empty storage compartment for which door 42 was closed, it is considered that the good was delivered from vehicle storage compartment 71 to the empty storage compartment and the good information is automatically registered in the stocker information. Therefore, there is no need for an operator to use reading device 44 or the like to perform work of reading code information, and delivery of goods can be performed efficiently.

Next, correspondences between constituent elements of the present embodiment and constituent elements of the disclosure will be clarified here. Storage compartment 41 of the present embodiment corresponds to a storage compartment of the present disclosure, stocker 40 corresponds to a stocker, stocker system 11 corresponds to a stocker system, memory section 54 corresponds to a stocker information memory section, control section 52 that performs delivery processing of FIG. 8 and the like corresponds to a stocker information updating section, and control section 52 that performs stopping processing of FIG. 5 corresponds to a stopping position setting section. Memory section 84 corresponds to a loading information memory section. Good sensor 47 corresponds to a storage compartment detecting section, open-closed sensor 48 corresponds to an open-closed detecting section, good sensor 77 corresponds to a loading detecting section, and control section 82 that performs transport vehicle delivery processing of FIG. 9 and the like corresponds to a loading information updating section.

With stocker system 11 as described above, stocker control device 50 sets stopping position P of transport vehicle 60 based on arrangement position information of empty storage compartments acquired from stocker information 55. Therefore, even if the positions of empty storage compartments are constantly changing due to goods being taken in and out, it is possible to efficiently load goods by stopping transport vehicle 60 at a suitable stopping position P.

Also, because stocker control device 50 sets stopping position P based on loading position information of goods and arrangement position information of empty storage compartments such that the loading positions of goods and the arrangement positions of the empty storage compartments are close to each other, the delivery distance for goods when being loaded is shorter. Further, one by one the empty storage compartments and vehicle storage compartments 71 are opened, and if there is no good inside the vehicle storage compartment 71 for which door 72 was closed, and there is a good inside the empty storage compartment for which door 42 was closed, it is considered that the good was delivered from vehicle storage compartment 71 to the empty storage compartment and the good information is automatically registered in the stocker information. Therefore, when loading goods into storage compartments 41, reading work can be omitted, meaning that loading of goods is performed with even better efficiency.

Meanwhile, it goes without saying that the present disclosure is not limited to the above-mentioned embodiments and various embodiments may be applied within the technical scope of the disclosure.

For example, in an embodiment above, stopping position P is set based on arrangement position information of empty storage compartments and loading position information of goods, but the configuration is not limited to this, stopping position P may be calculated based on the arrangement position information of the empty storage compartments without using the loading position information of the goods, or stopping position P may be set based on the loading position information of the goods without using the arrangement position information of the empty storage compartments. In the former case, stopping position P may be set such that a central position of vehicle stocker 70 is in front of a location with a greater quantity of empty storage compartments in stocker 40, or stopping position P may be set such that a central position of each empty storage compartment matches the central position of vehicle stocker 70. In the latter case, stopping position P may be set such that a location with a greater number of vehicle storage compartments 71 with goods that are delivery targets is in front of a central position of stocker 40, or stopping position P may be set such that the central position of those vehicle storage compartments 71 and the central position of stocker 40 match.

In an embodiment above, stocker control device 50 acquires good loading position information and the like from loading information 85 when transport vehicle 60 is within a management range of stocker 40, that is, when transport vehicle 60 is within a specified range close to stocker 40, but the configuration is not limited to this. For example, stocker control device 50 may acquire good loading position information and the like when transport vehicle 60 leaves to go to stocker 40, or while moving towards stocker 40. For example, stocker management device 30 may acquire required information from loading information 85 of transport vehicle 60 and send it to stocker 40. Also, stocker control device 50 uses goods loading position information acquired from loading information 85 in setting processing for stopping position P, but the configuration is not limited to this. For example, stocker control device 50 may find out the distribution state of the loading positions of the goods that are delivery targets from the loading position information, and perform processing to determine the positions of empty storage compartments to which goods are to be loaded in stocker 40 from another transport vehicle and make the distribution state of empty storage compartments correspond to the distribution state that was found out from the loading position information. By doing this, the distance delivery person 19 moves when performing loading work of goods and opening one by one storage compartments 41 and vehicle storage compartments 71 as in an embodiment above will be further curtailed.

In an embodiment above, as well as stopping transport vehicle 60 at stopping position P set from loading position information of goods and arrangement position information of empty storage compartments, goods are loaded after opening storage compartments 41 and vehicle storage compartments 71 one by one, but the configuration is not limited to this. For example, stopping transport vehicle 60 at stopping position P set from loading position information of goods and arrangement position information of empty storage compartments may be performed along with performing loading of goods while reading code information or the like using reading device 44 or the like. Alternatively, transport vehicle 60 could be appropriately stopped at a position near stocker 40 and then loading of goods performed by opening storage compartments 41 and vehicle storage compartments 71 one by one without setting stopping position P.

In an embodiment above, stocker control device 50 sets stopping position P, but the configuration is not limited to this, and any of the devices of stocker system 11 could set stopping position P. For example, stocker management device 30, traveling control device 61 of transport vehicle 60, or stocker control device 80 may acquire arrangement position information of empty storage compartments and loading position information of goods and set stopping position P.

In an embodiment above, stocker control device 50 updates stocker information 55, and stocker control device 80 updates loading information 85, but the configuration is not limited to this, any of the devices of stocker system 11 may update stocker information 55 or loading information 85, for example, stocker management device 30.

In an embodiment above, stocker system 11 is provided with stocker management device 30 and stocker 40, but the configuration is not limited to this, stocker 40 may have the functionality of stocker management device 30. Also, in an embodiment above, sales management device 21 and stocker management device 30 are separate servers, but stocker management device 30 may have functionality of sales management device 21. Also, stocker system 11 is provided with transport vehicle 60, but transport vehicle 60 may be managed by sales management system 10.

In an embodiment above, a positioning mark, for example, a 2D code for positioning, is provided on stocker 40. Transport vehicle 60 is able to image positioning mark of stocker 40 using imaging device 75, or transport vehicle 60 is provided with an imaging device dedicated to imaging positioning marks on stocker 40, such that transport vehicle 60 images positioning marks of stocker 40 using imaging device 75 or a dedicated imaging device. Also, control section 62 may recognize the current position of transport vehicle 60 from the position of the positioning mark in the image detected by image processing a captured image. A positioning mark of stocker 40 is provided at a height at which imaging is possible by imaging device 75 of transport vehicle 60 or a dedicated imaging device. Further, in a case in which the traveling direction of transport vehicle 60 with respect to stocker 40 is fixed in a certain direction, the positioning mark may be provided upstream in the traveling direction of transport vehicle 60 from the left-right center of the front surface of stocker 40.

In an embodiment above, control section 52 determines whether there is a non-authenticated transport vehicle 60 inside a management range, but the configuration is not limited to this, for example, when a transport vehicle enters the management range, the control device may notify control section 52 of the fact via communication sections 66 and 56. For example, control section 62, upon detection of the positioning mark by image processing of the image captured by imaging device 75 or the above dedicated imaging device, may notify control section 52 that transport vehicle 60 has entered the management range. Control section 52, upon being notified that transport vehicle 60 has entered the management range, may determine that a non-authenticated transport vehicle has entered the management range, and then perform processing from S110. Further, control section 62, as well as notifying that transport vehicle 60 has entered the management range, may also send authentication information of transport vehicle 60 to control section 52. In this case, control section 52 may perform processing of S200 and S210 using the authentication information of transport vehicle 60 sent from control section 62 of transport vehicle 60.

In an embodiment above, control section 52 sets stopping position P of transport vehicle 60, and sends a stopping instruction to stop at the set stopping position P to control section 62 of transport vehicle 60, but the configuration is not limited to this, control section 52 may send information of the stopping position P to control section 62. Also, control section 52 may send information of stopping position P with reference to the positioning mark provided on stocker 40 to control section 62. Control section 62 may then determine whether transport vehicle 60 has stopped at stopping position P based on the received information of the stopping position P and the current position of transport vehicle 60 recognized by image processing the reference mark imaged by imaging device 75 or the dedicated imaging device.

In an embodiment above, control section 52 sets one stopping position P and sends it to control section 62 of transport vehicle 60, but the configuration is not limited to this. For example, when there are multiple delivery target goods for stocker 40 and the multiple empty storage compartments selected by control section 52 are greater than a specified distance apart in the left-right direction of the front surface of stocker 40, control section 52 may set multiple stopping positions P and send their information to control section 62. In this case, control section 52 may also send information of which goods are to be delivered at each stopping position P to control section 62.

In an embodiment above, delivery person 19 drives transport vehicle 60 to move to stocker 40 and transfers goods from vehicle storage compartments 71 to storage compartments 41, but the configuration is not limited to this. For example, transport vehicle 60 may move to stocker 40 via automatic driving. Further, transferring of goods from vehicle storage compartments 71 to storage compartments 41 may also be performed by an automatic device. For example, an articulated robot or Cartesian robot provided on transport vehicle 60 or stocker 40 may transfer or load goods. Alternatively, a small automatic carrier vehicle that is lowered to floor level from cargo bed 69 of transport vehicle 60 may be loaded, and the automatic carrier vehicle may perform transfer or loading.

In an embodiment above, transport vehicle 60 is provided with vehicle stocker 70 that is similar to stocker 40, but the configuration is not limited to this. For example, transport vehicle 60 may be provided with a box-shaped cargo hold with doors that open and close, and the loading position (arrangement position) of each good inside the cargo hold may be divided, and good shelves without doors may be provided at each loading position. In this case, loading information 85 formed by using sensors to detect the presence of goods at each loading position may be managed, and processing may be performed the same as in FIG. 9 except that processing related to opening the closing doors is omitted.

A first stocker system of the present disclosure may be configured as given below. For example, a first stocker system of the present disclosure may include: a loading information memory section configured to memorize loading information including loading position information of the good in the transport vehicle, and information of presence or absence of the good at a loading position, wherein the stopping position setting section is configured to acquire the loading position information of the good from the loading information and to set the stopping position such that the loading position of the good to be put into the empty storage compartment is close to the arrangement position of the empty storage compartment. In this manner, the transfer distance of the good when delivering the good is reliably shortened, and delivery of goods is performed efficiently.

A first stocker system of the present disclosure may further include: a storage compartment detecting section configured to detect presence or absence of the good inside the storage compartment; an open-closed detecting section configured to detect the opening or closing of a door of the storage compartment; a loading detecting section configured to detect presence or absence of the good at multiple of the loading positions of the transport vehicle; the loading information memory section configured to memorize loading information including the loading position of the good in the transport vehicle, information of presence or absence of the good at the loading positions, and specified information of the good; and the loading information updating section configured to update the loading information based on the presence or absence of the good at the loading positions, wherein the stocker information memory section is configured to memorize stocker information including the specified information of the good in the storage compartment, the loading information updating section is configured to update the loading information such that, when the good is moved from the transport vehicle to the storage compartment, with respect to the loading position at which the loading detecting section no longer detects the good, the good is considered absent for that loading position in the loading information, and the specified information is sent to the stocker information updating section and deleted, and the stocker information updating section is configured to update the stocker information such that, with respect to the storage compartment for which it was detected by the open-closed detecting section that the door went from being open to being closed and for which the good was detected by the storage compartment detecting section, the good is considered present in the storage compartment in the stocker information, and the specified information sent from the loading information updating section is registered linked to the corresponding storage compartment. In this manner, when delivering goods from a transport vehicle to a storage compartment, specified information attached to a good can be registered to stocker information without, for example, needing to use to reading device to read the specified information. Therefore, reading work using a reading device or the like can be omitted and delivery of goods can be performed efficiently.

A second stocker system of the present disclosure is a stocker system for transporting goods via a transport vehicle to a stocker with multiple storage compartments, the stocker system including: a loading information memory section configured to memorize loading information including loading position information of the good in the transport vehicle, and information of presence or absence of the good at a loading position; and a processing section configured to acquire the loading position information of the good from the loading information and to perform specified processing with respect to the good to be put into the storage compartment based on the acquired loading position information of the good. With this stocker system, loading position information of goods loaded in a transport vehicle is reflected in specified processing related to delivery of goods to storage compartments, thus delivery of goods to the storage compartments is efficient. Specified processing, for example, is processing for setting a stopping position of the transport vehicle when delivering the goods to the storage compartments.

A third stocker system of the present disclosure is a stocker system for transporting a good via a transport vehicle to a stocker with multiple storage compartments, the stocker system comprising: a storage compartment detecting section configured to detect presence or absence of the good inside the storage compartment; an open-closed detecting section configured to detect the opening or closing of a door of the storage compartment; a stocker information memory section configured to memorize stocker information including arrangement position information of the storage compartments in the stocker, information of presence or absence of the good in the storage compartments, and specified information of the good in the storage compartment; a stocker information updating section configured to update the stocker information based on the presence or absence of the good in the storage compartment; a loading detecting section configured to detect the presence or absence of the good at multiple of the loading positions of the transport vehicle; a loading information memory section configured to memorize loading information including the loading position information of the good in the transport vehicle, information of the presence or absence of goods at the loading position, and the specified information of the good; and a loading information updating section configured to update the loading information based on the presence or absence of the good at the loading position, wherein the loading information updating section is configured to update the loading information such that, when the good is moved from the transport vehicle to the storage compartment, with respect to the loading position at which the loading detecting section no longer detects the good, the good is considered absent for that loading position in the loading information, and the specified information is sent to the stocker information updating section and deleted, and the stocker information updating section is configured to update the stocker information such that, with respect to the storage compartment for which it was detected by the open-closed detecting section that the door went from being open to being closed and for which the good was detected by the storage compartment detecting section, the good is considered present in the storage compartment in the storage information, and the specified information sent from the loading information updating section is registered linked to the corresponding storage compartment. With this stocker system, when delivering goods from a transport vehicle to a storage compartment, specified information attached to a good can be registered to stocker information without, for example, needing to use to reading device to read the specified information. Therefore, reading work using a reading device or the like can be omitted and delivery of goods can be performed more efficiently.

INDUSTRIAL APPLICABILITY

The present disclosure is applicable in the technological field of a stocker system in which goods are delivered to a stocker via a transport vehicle.

REFERENCE SIGNS LIST

1: sales management system;
11: stocker system;
12, 13: network;
14: purchaser;
15: mobile terminal;
17: product;
19: delivery person;
20: shop;
21: sales management device;
22, 32, 52, 62, 82: control section;
24, 34, 54, 64, 84: memory section;
26, 36, 56, 66, 86: communication section;
30: stocker management device;
35, 55: stocker information;
40, 40A, 40B: stocker;
41: storage compartment;
42, 72: door;
43, 73: display-operation section;
44, 74: reading device;
45, 75: imaging device;
46, 76: lock mechanism;
47, 77: goods sensor;
48, 78: open-closed sensor;
50, 80: stocker control device;
60: transport vehicle;
61: traveling control device;
68: GPS positioning section;
69: cargo bed;
70: on-vehicle stocker;
71: on-vehicle storage compartment;
85: loading information

The invention claimed is:

1. A stocker system for transporting a good via a transport vehicle to a stocker with multiple storage compartments, the stocker system comprising:

a stocker information memory section configured to memorize stocker information including arrangement position information of the storage compartments the stocker, and information of presence or absence of the good in the storage compartments;

a stocker information updating section configured to update the stocker information in accordance with the goods being taken in and out of the storage compartments;

a loading information memory section configured to memorize loading information including loading position information of the good in a vehicle storage component of the transport vehicle, and information of presence or absence of the good at a loading position in the vehicle storage component;

a stopping position setting section configured to
   acquire the arrangement position information of an empty storage compartment from the stocker information and the loading position information of the good from the loading information, and
   set a stopping position of the transport vehicle relative to the stocker for the good to be put into the empty storage compartment based on the acquired arrangement position information of the empty storage compartment so that a central position of the empty storage compartment in a sideways direction of the stocker matches a central position of the vehicle storage component in a sideways direction of the vehicle storage component or a center of gravity of the empty storage compartment in the sideways direction of the stocker matches a center of gravity of the vehicle storage component in the sideways direction of the vehicle storage component such that the loading position of the good to be put into the empty storage compartment is close to the arrangement position of the empty storage compartment, and a stopping instruction communication section configured to send, to the transport vehicle, instructions for the transport vehicle to stop at the stopping position.

2. The stocker system according to claim 1, further comprising:

a storage compartment detecting section configured to detect presence or absence of the good inside the storage compartment;

an open-closed detecting section configured to detect the opening or closing of a door of the storage compartment;

a loading detecting section configured to detect presence or absence of the good at multiple of the loading positions of the transport vehicle;

the loading information memory section configured to memorize loading information including the loading position of the good in the transport vehicle, information of presence or absence of the good at the loading positions, and specified information of the good; and the loading information updating section configured to update the loading information based on the presence or absence of the good at the loading positions, wherein the stocker information memory section is configured to memorize stocker information including the specified information of the good in the storage compartment, the loading information updating section is configured to update the loading information such that, when the good is moved from the transport vehicle to the storage compartment, with respect to the loading position at which the loading detecting section no longer detects the good, the good is considered absent for that loading position in the loading information, and the specified information is sent to the stocker information updating section and deleted, and the stocker information updating section is configured to update the stocker information such that, with respect to the storage compartment for which it was detected by the open-closed detecting section that the door went from being open to being closed and for which the good was detected by the storage compartment detecting section, the good is considered present in the storage compartment in the stocker information, and the specified information sent from the loading information updating section is registered linked to the corresponding storage compartment.

3. The stocker system according to claim 1, the stopping position setting section configured to set the stopping position based on a distance of the central position of the empty storage compartment in the sideways direction of the stocker from a reference position of the stocker, a distance of the central position of the vehicle storage component in the sideways direction of the vehicle storage component from a reference position of the vehicle storage component, and a distance from the reference position of the vehicle storage component to a leading end of the transport vehicle.

* * * * *